US008844865B2

(12) United States Patent
Gehm et al.

(10) Patent No.: US 8,844,865 B2
(45) Date of Patent: Sep. 30, 2014

(54) PASSENGER SERVICES CONDUIT

(75) Inventors: Marcus Gehm, Buxtehude (DE);
Thomas Vogt, Hamburg (DE); Andreas Dannenberg, Neu Wulmstorf (DE)

(73) Assignee: Airbus Operations GmbH, Hamburg (DE)

( * ) Notice: Subject to any disclaimer, the term of this patent is extended or adjusted under 35 U.S.C. 154(b) by 84 days.

(21) Appl. No.: 13/277,289

(22) Filed: Oct. 20, 2011

(65) Prior Publication Data
US 2012/0032027 A1 Feb. 9, 2012

Related U.S. Application Data

(63) Continuation of application No. PCT/EP2010/055187, filed on Apr. 20, 2010.

(60) Provisional application No. 61/170,948, filed on Apr. 20, 2009.

(30) Foreign Application Priority Data

Apr. 20, 2009 (DE) .......................... 10 2009 018 111

(51) Int. Cl.
*B64D 11/00* (2006.01)
*B64D 47/02* (2006.01)
*B64D 13/00* (2006.01)

(52) U.S. Cl.
CPC ........ *B64D 11/00* (2013.01); *B64D 2011/0053* (2013.01); *B64D 11/0015* (2013.01); *B64D 2231/025* (2013.01); *B64D 2013/003* (2013.01); *B64D 2221/00* (2013.01); *B64D 47/02* (2013.01)

USPC .................. 244/118.5; 244/118.1; 244/129.1; 244/118.2

(58) Field of Classification Search
USPC ....................... 244/118.5, 118.1, 129.1, 118.2
See application file for complete search history.

(56) References Cited

U.S. PATENT DOCUMENTS

| | | | | |
|---|---|---|---|---|
| 3,330,506 A | * | 7/1967 | Robillard et al. | 244/118.5 |
| 4,023,874 A | * | 5/1977 | Jong et al. | 312/291 |
| 4,071,210 A | * | 1/1978 | Mutke | 244/118.6 |
| D259,038 S | * | 4/1981 | Smith | D12/195 |

(Continued)

FOREIGN PATENT DOCUMENTS

| | | |
|---|---|---|
| DE | 19502658 C1 | 3/1996 |
| DE | 10307147 A1 | 9/2004 |

(Continued)

OTHER PUBLICATIONS

German Office Action dated Mar. 11, 2009 for German Application No. 102009018111.3 dated Nov. 3, 2009.

(Continued)

*Primary Examiner* — Isam Alsomiri
*Assistant Examiner* — Assres H Woldemaryam
(74) *Attorney, Agent, or Firm* — Ingrassia Fisher & Lorenz, P.C.

(57) ABSTRACT

A multifunctional module is provided for a passenger services conduit in an aircraft. The multifunctional module includes, but is not limited to a first interface and at least one utility unit for providing a passenger with services. The first interface is for connecting the utility unit to the passenger utility conduit, the interface, for example, being designed as a mechanical interface.

18 Claims, 3 Drawing Sheets

(56) References Cited

U.S. PATENT DOCUMENTS

| | | | |
|---|---|---|---|
| 4,736,452 A | | 4/1988 | Daniels et al. |
| 4,952,023 A | * | 8/1990 | Bradshaw et al. ............ 359/529 |
| 5,651,733 A | | 7/1997 | Schumacher |
| 5,707,028 A | * | 1/1998 | Roeper ...................... 244/118.5 |
| 5,736,754 A | * | 4/1998 | Shi et al. .......................... 257/89 |
| 5,944,284 A | * | 8/1999 | Bardel ........................ 244/118.5 |
| 6,454,209 B1 | * | 9/2002 | Bock et al. ................. 244/118.5 |
| 6,489,745 B1 | * | 12/2002 | Koreis .......................... 320/108 |
| 6,796,690 B2 | | 9/2004 | Bohlander |
| 6,824,104 B2 | * | 11/2004 | Smallhorn ................ 244/118.5 |
| 6,848,653 B2 | * | 2/2005 | Finke et al. ................. 244/118.5 |
| 7,027,767 B2 | | 4/2006 | De La Chapelle et al. |
| 7,150,548 B2 | | 12/2006 | Kohlmeier-Beckmann et al. |
| 7,360,910 B2 | * | 4/2008 | Korral et al. .................... 362/30 |
| 7,431,034 B2 | * | 10/2008 | Westphal et al. ......... 128/204.18 |
| 7,448,574 B2 | * | 11/2008 | Young et al. ............... 244/118.5 |
| 7,455,263 B2 | * | 11/2008 | Lau et al. ................... 244/118.5 |
| 7,621,275 B2 | * | 11/2009 | Fischer .................... 128/206.27 |
| 7,671,736 B2 | | 3/2010 | Iverson et al. |
| 7,893,557 B2 | * | 2/2011 | Davis et al. .................... 307/9.1 |
| 8,353,477 B2 | * | 1/2013 | Mayer et al. ................ 244/118.5 |
| 8,382,034 B2 | * | 2/2013 | Beentjes et al. ............ 244/118.5 |
| 2004/0195446 A1 | * | 10/2004 | Smallhorn ................ 244/118.5 |
| 2004/0213005 A1 | | 10/2004 | Kohlmeier-Beckmann et al. |
| 2005/0263156 A1 | * | 12/2005 | Westphal et al. ......... 128/205.25 |
| 2006/0032979 A1 | | 2/2006 | Mitchell et al. |
| 2006/0237585 A1 | * | 10/2006 | Lau et al. ................... 244/118.5 |
| 2007/0057785 A1 | * | 3/2007 | Lee .............................. 340/541 |
| 2007/0069634 A1 | * | 3/2007 | Carmon et al. ............... 313/504 |
| 2008/0089079 A1 | | 4/2008 | Gunnewig et al. |
| 2008/0112155 A1 | | 5/2008 | Scown et al. |
| 2008/0219013 A1 | * | 9/2008 | Budinger et al. ............. 362/471 |
| 2010/0087130 A1 | * | 4/2010 | Nitsche et al. .................. 454/76 |
| 2010/0096919 A1 | | 4/2010 | Meckes et al. |
| 2011/0062285 A1 | * | 3/2011 | Herzog et al. ............. 244/118.6 |

FOREIGN PATENT DOCUMENTS

| | | |
|---|---|---|
| DE | 102004039189 A1 | 2/2006 |
| DE | 102006049030 B3 | 4/2008 |
| DE | 102007014406 B3 | 4/2008 |
| DE | 102006061455 A1 | 6/2008 |
| GB | 2430118 A | 3/2007 |
| WO | 03052974 A1 | 6/2003 |
| WO | 2007150070 A2 | 12/2007 |
| WO | 2009062614 A2 | 5/2009 |

OTHER PUBLICATIONS

International Search Report for Application No. PCT/EP2010/055187 dated Feb. 9, 2011.

German Patent Office, German Office Action dated May 7, 2012 for German Patent Application No. 10 2009 018 111.3.

Heise Zeltschriften Verlag, IDF: Notebook-Akkus drahtlos laden, Aug. 22, 2008.

Wiesspeiner, G., Drahtlos Akkus aufladen mit Zeitangabe, BTI—Technologie and Innovation, Graz, Germany.

WIPO International Preliminary Report on Patentability dated Oct. 25, 2011 for International Application No. PCT/EP2010/055187.

Moir, I; Seabridge, A., Aircraft Systems: Mechanical, Electrical and Avionics Subsystems Integration, 3rd Edition, ISBN: 978-0-470-05996-8, Apr. 2008.

Owens, K., Connectorless Power Supply for an Aircraft-Passenger Entertainment System, IEEE Transactions on Power Electronics, vol. 4, No. 3, Jul. 1989.

German Patent Office, German Office Action dated Jul. 24, 2012 for German Patent Application No. 10 2009 018 111.3.

* cited by examiner

PASSENGER SERVICES CONDUIT

CROSS-REFERENCE TO RELATED APPLICATION

The application is a continuation of International Application No. PCT/EP2010/055187, filed Apr. 20, 2010, which was published under PCT Article 21(2) and which claims priority to German Patent Application No. 10 2009 018 111.3, filed 20 Apr. 2009, and of the US provisional application 61/170,948, filed 20 Apr. 2009, the disclosures of which applications are all hereby incorporated herein in their entirety by reference.

TECHNICAL FIELD

The technical field relates to the provision of services to passengers in an aircraft. In particular, the technical field relates to a passenger services conduit with a multifunctional module, to an aircraft with a passenger services module, and to a method for providing services to passengers by means of a multifunctional module for a passenger services conduit in an aircraft.

BACKGROUND

Passenger services units such as reading lights, loudspeakers and signs, air nozzles, oxygen masks, infill panels can be made up individually as single elements for each passenger layout and can be placed in an aircraft or in a passenger services conduit in such a manner that the elements are aligned with the seats.

In this arrangement the precise position must be observed and the gap dimensions must be checked and adjusted. The associated effort and expenditure for definition, administration and installation is very considerable and often involves a great deal of time and money. The minutest differences in the position and in the color, which differences are, for example, due to various manufacturers of the elements, are visually quite evident and time and again result in complaints from the airlines. Likewise, any changes made to the layout require considerable expenditure in terms of adapting the passenger services conduit.

From DE 103 07 147 A1 and US 2004/0213005 A1 a reading light for aircraft cabins is known, which reading light is installed above a passenger seat.

DE 10 2006 049 030 B3 describes a loudspeaker system for an aircraft cabin. U.S. Pat. No. 3,330,506 describes a multifunctional module traversable alongside rails for a passenger services conduit in an aircraft. In doing so, an oxygen supply line may be connected via a quick-connection coupling.

In GB 2 430 118 A, a passenger service unit (PSU) is described which may be snapped on mounting rails; the current supply for such a PSU takes place via a conductor rail which may be formed unitary with a mounting rail. A wireless passenger control unit and a wireless receiver of the PSU serve for transmitting control commands.

DE 10 2007 014 406 B3 describes a services conduit with an air distribution system for airplanes, an airplane with such a services conduit, and a method for forming a services conduit. The services conduit brings about a variable positioning of air nozzles along its longitudinal extension, and in the services conduit additional supply lines and arrangements may be provided, e.g. for providing seats with current, or for providing loudspeakers integrated into the services conduit with electrical signals.

DE 195 02 658 C1 describes an arrangement for supplying passengers in a passenger cabin, in particular in an airplane, consisting of a services unit with comfort elements and control elements, like an reading light, a steward calling key, a loudspeaker, an air nozzle, etc., and feeding lines from a supply line to the services unit.

US 2008/0112155 A1 describes a passenger supply unit (PSU) with a housing having an air nozzle attached thereto, wherein a ring of light emitting diodes is arranged at the housing such that the diodes surround the air nozzle.

In WO 03/052974 A1 a local area network on a mobile platform, e.g. an airplane, is described which has a direct signal transmission of infrared signals between a passenger seat and a passenger supply unit (PSU) arranged above.

US 2006/0032979 A1 describes a system for determining the configuration of the inner cabin of an airplane in which radio frequency transmitters are provided which transmit radio frequency signals which interfere with each other and form a resulting signal which is employed for determining the position of objects.

DE 10 2006 061 455 A1 describes an arrangement of at least one passenger supply unit (PSU), e.g. in an airplane, wherein a rail is arranged which comprises at least one conductor. The PSU has at least one current collector arranged such that it contacts the at least one conductor of the rail in the built-in state of the PSU.

U.S. Pat. No. 6,796,690 B2 describes an LED light source for passenger cabins which has an ordered arrangement of a plurality of LEDs, wherein an electronic control adjusts the current level for certain LEDs such that different light beam patterns are provided. The communication with the LED light source is performed via a serial data bus.

From US 2008/0089079 A1 a lighting unit for example for airplanes is known which comprises several illumination elements which may be activated singly or in groups. The illumination elements may be formed as LEDs the anodes and cathodes of which are connected to a printed circuit board on which the control electronics and the power electronics of the lighting unit are provided.

It may be considered an object to provide a simple, economical and flexible supply of services to passengers. In addition, other objects, desirable features and characteristics will become apparent from the subsequent summary and detailed description, and the appended claims, taken in conjunction with the accompanying drawings and this background.

SUMMARY

A passenger services conduit is provided that comprises a multifunctional module with a first interface and at least one services unit for providing services to a passenger. The first interface is designed for connecting the at least one services unit to the passenger services conduit.

The term "multifunction" or "multifunctional" means that, for example, all the functions for providing services to the passenger are of an integrated design so that no further installations are necessary for providing services to passengers. The term "module" refers to a component that can be integrated in a housing and that can easily be exchanged as a unit.

According to an embodiment, automatic connection of the at least one services unit to the passenger services conduit takes place during installation of the multifunctional module on the passenger services conduit. Automatic connection of the at least one services unit to the passenger services conduit can be designed in a contactless manner.

Such automatic connection of the services unit during installation of the multifunctional module on the passenger services conduit makes possible, for example, easy installation, easy reconfiguration and the installation of various customer versions of the consumer unit without any adaptations in the aircraft.

According to a further embodiment, the interface is designed as a mechanical interface. The mechanical interface is designed for attaching the multifunctional module to the passenger services conduit and for connecting the services units to the passenger services conduit.

According to a further embodiment, the services unit is formed from a group comprising a reading light unit, a loudspeaker unit, a character display unit, an air nozzle unit, an oxygen supply unit, an oxygen storage unit or oxygen generating unit, and a flap.

According to a further embodiment, a host of further interfaces and services units can be provided, which are all connectable to corresponding supply lines of the passenger services conduit.

Such a multifunctional module makes it possible for the expenditure for definition and administration as well as installation of passenger services units in the passenger services conduit (PSC) to be able to be reduced.

Such a multifunctional unit further comprises the advantage that changes to the cabin can be made possible by quick adaptation of the services units.

In such a multifunctional unit the manufacturing process of the multifunctional unit and of the passenger services conduit can be simplified because gap dimensions and interfaces for individual services units are no longer an issue. The entire multifunctional module can, for example, be checked by the manufacturer in terms of quality and function, and consequently faults resulting from tilting individual services units or failing to reach minimum gap dimensions in the manufacture of individual services units are no longer an issue.

Such a multifunctional module is associated with the advantage that the passenger services conduit can be designed so as to be visually pleasing in that, for example, exposed locations between two multifunctional elements no longer need to be covered by means of infill panels of different lengths.

According to a further embodiment, the multifunctional module is affixed by way of the first interface by means of mechanical connection to the passenger services conduit.

According to a further embodiment, the mechanical connection of the module to the PSC is not visible.

According to a further embodiment, several services units are designed so as to be integrated in the multifunctional module.

According to a further embodiment, connecting the at least one services unit takes place automatically during movement of the multifunctional module to an end position when the multifunctional module is installed on the passenger services conduit.

According to a further embodiment of the invention, moving the multifunctional module takes place in a direction parallel to a longitudinal axis of the aircraft.

According to a further embodiment, connecting the at least one services unit takes place automatically, for all the services units described below, during movement of the multifunctional module to an end position when the multifunctional module is installed on the passenger services conduit.

According to a further embodiment, the multifunctional module furthermore comprises a communication unit. The communication unit is designed for wirelessly receiving and for wirelessly transmitting data for controlling the at least one services unit of the multifunctional module.

According to a further embodiment, a cabin management system of the aircraft is designed for wirelessly receiving and for wirelessly transmitting data for controlling the at least one services unit of the multifunctional module from or to the communication unit.

According to a further embodiment, the multifunctional module furthermore comprises a reading light unit. The reading light unit is designed for providing illumination for reading for passengers of the aircraft. The reading light unit can be designed using technology from the group comprising light emitting diode (LED) technology and organic light emitting diode (OLED) technology.

According to a further embodiment, the multifunctional module further comprises a loudspeaker unit. The loudspeaker unit is designed for transmitting acoustic data to the passengers of the aircraft.

According to a further embodiment, the multifunctional module further comprises a character display unit. The character display unit is designed for displaying characters to the passengers of the aircraft, and the character display unit is designed with icon screens arranged in front, or with organic light emitting diode (OLED) films or foils. In this arrangement the OLED film or foil can, for example, be affixed to several multifunctional modules as strips for several multifunctional modules after installation of the multifunctional modules.

According to a further embodiment, the multifunctional module comprises an air nozzle unit and a blower unit. The air nozzle unit is designed for providing air for passengers of the aircraft, and the blower unit is designed for sucking in and blowing out ambient air for the air nozzle unit.

According to a further embodiment, the multifunctional module comprises a fresh-air supply pipe. The blower unit is designed for exhausting fresh air from the fresh-air supply pipe for the air nozzle unit. In this arrangement the fresh-air supply pipe can be connected to a supply pipe of an aircraft.

According to a further embodiment, the multifunctional module comprises an oxygen supply unit and an oxygen storage unit. The oxygen supply unit is designed for supplying passengers with oxygen, and wherein the oxygen storage unit is designed for storing oxygen and for supplying the oxygen supply unit with oxygen.

In this arrangement the oxygen supply unit can, for example, be designed as an oxygen mask, and the oxygen storage unit can comprise a chemical cartridge and/or a compressed-gas cylinder.

According to a further embodiment, the multifunctional module comprises a position acquisition unit. The position acquisition unit is designed for acquiring a defined end position of the multifunctional module during installation of the multifunctional module on the passenger services conduit.

According to a further embodiment, the position acquisition unit is designed for emitting a signal when the multifunctional module has reached the defined end position during installation of the multifunctional module on the passenger services conduit. In this arrangement the signal can be acoustic or visual.

According to a further embodiment, the multifunctional module comprises a flap. The oxygen supply unit is arranged behind the flap. The flap is designed for automatic opening in the case of an emergency, and the flap is designed for activation by a current impulse or by a data signal.

According to a further embodiment a passenger services conduit with a multifunctional module according to any one of the above-mentioned embodiments with a second interface is stated. The second interface is designed for connecting the services unit of the multifunctional module by way of the first interface.

According to an embodiment, the passenger services conduit comprises a power supply unit. The power supply unit is designed for wirelessly transmitting power from a power source of the aircraft. In this arrangement the wireless transmission of power can, for example, take place by way of electromagnetic coupling.

According to a further embodiment, the power supply unit is designed for transmitting current in a non-contacting manner to the services unit of the multifunctional module. In this arrangement transmitting current in a non-contacting manner to the services unit can, for example, take place by way of induction or resonance frequency.

According to a further embodiment, an aircraft with a multifunctional module according to any one of the above-mentioned exemplary embodiments is stated. The aircraft comprises a cabin management system. The cabin management system is designed for wire-bound or wireless communication with the multifunctional module, for example by way of a wireless communication connection.

According to a further embodiment, a method for providing services to passengers by means of a functional module for a passenger services conduit in an aircraft is provided, with a first step in which integrating at least one services unit in the multifunctional module takes place. In a second step affixing the multifunctional module to the passenger services conduit takes place by means of a first interface that can, for example, be designed as a mechanical interface. In a third step providing at least one function by means of the at least one services unit for a passenger of the aircraft takes place.

According to a further embodiment, the method further comprises automatically connecting the at least one services unit during movement of the multifunctional module in an installation position during installation of the multifunctional module on the passenger services conduit, as well as wirelessly providing the passenger services conduit with power by means of a power supply unit. Subsequently, wirelessly receiving and wirelessly transmitting data for controlling the at least one services unit of the multifunctional module by means of a communication unit takes place.

These and other aspects of the invention are set out and elucidated with reference to the exemplary embodiments described below.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
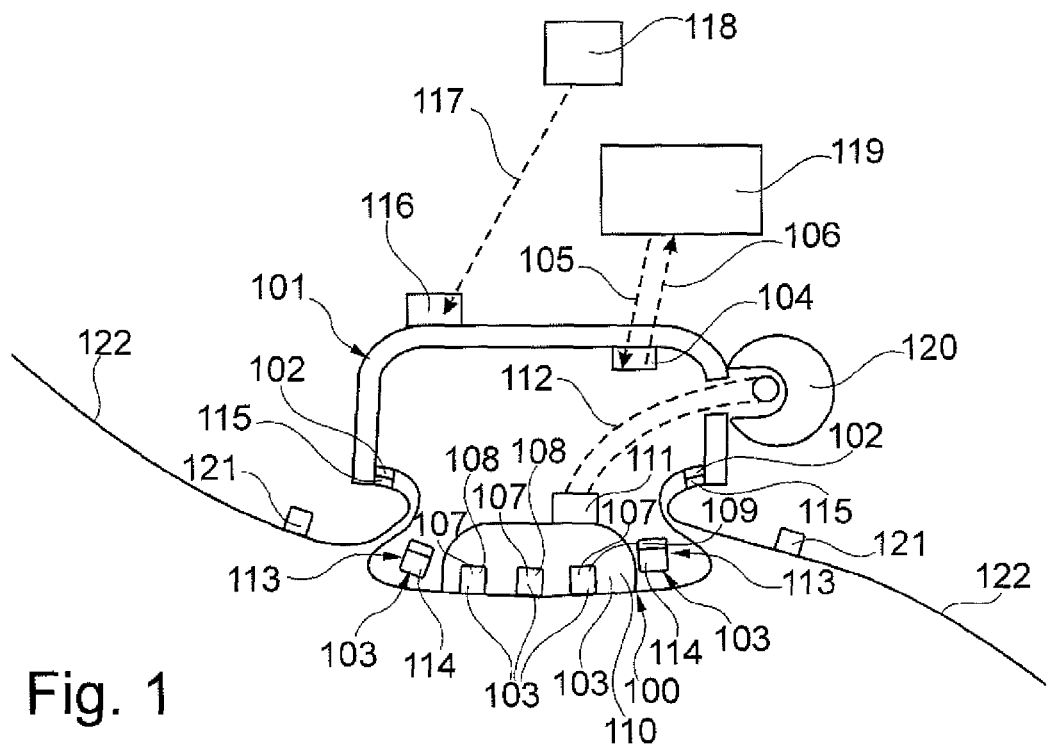
FIG. 1 shows a diagrammatic view of a cross-sectional view of a passenger services conduit with a multifunctional module according to an embodiment.
Figure 5:
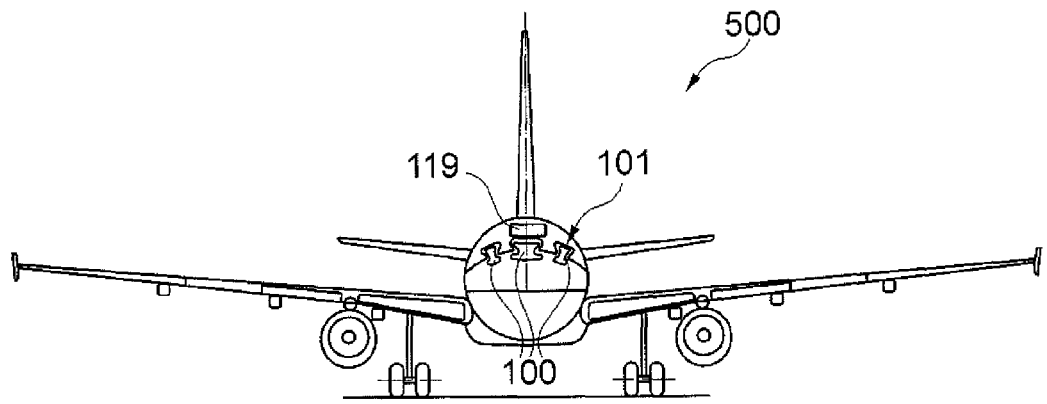
FIG. 5 shows a diagrammatic view of an aircraft with a multifunctional module according to an embodiment.

FIG. 1 shows a passenger services conduit 101 with a multifunctional module 100 that in each case is affixed by way of first interfaces 102 to two second interfaces 115 of the passenger services conduit 101. The passenger services conduit 101 is, in each case by way of a connection 121, affixed to an aircraft cabin wall 122, which may include an aircraft cabin ceiling (FIG. 5).

The passenger services conduit 101 comprises a power supply unit 116 which is designed for wirelessly transmitting 117 power from a power source 118 of an aircraft. Transmission 117 of power from the power source 118 of the aircraft 500 can, for example, take place by way of an electromagnetic coupling.

The power supply unit 116 of the passenger services conduit 101 is designed for non-contacting transmitting of a current to a services unit 103 of the multifunctional module 100, wherein the non-contacting transmission of current takes place wirelessly, for example by way of induction or resonance frequency.

The multifunctional module 100 comprises several services units 103 for providing services to a passenger, wherein the first interface 102 is designed for connecting the services units to the passenger services conduit 101.

The multifunctional module 100 comprises three reading light units 107 as well as an air nozzle unit 110 for providing air for passengers of the aircraft, and a blower unit 111, which is connected to the air nozzle unit, for sucking in and blowing out ambient air for the air nozzle unit 110 by way of a fresh-air supply pipe 112 that is connected to a supply pipe 120.

The multifunctional module further comprises a communication unit 104 which is designed for wirelessly receiving 105 and for wirelessly transmitting 106 data for controlling the services units 103 of the multifunctional module. In this arrangement the data for controlling the at least one services unit 103 can be wirelessly received 105 by a cabin management system 119 of the aircraft, and can be wirelessly transmitted 106 to the cabin management system 119.

The multifunctional module further comprises two oxygen supply units 113 which can be designed in the form of two oxygen masks 113, and which are arranged in each case behind a flap 114. The flap 114 is designed for automatic opening in the case of an emergency and can be activated by means of a current impulse or by means of a data signal.

The reading light units 107 can be designed with technology from the group comprising light emitting diode (LED) technology 108 and organic light emitting diode (OLED) technology 109.

Figure 2:
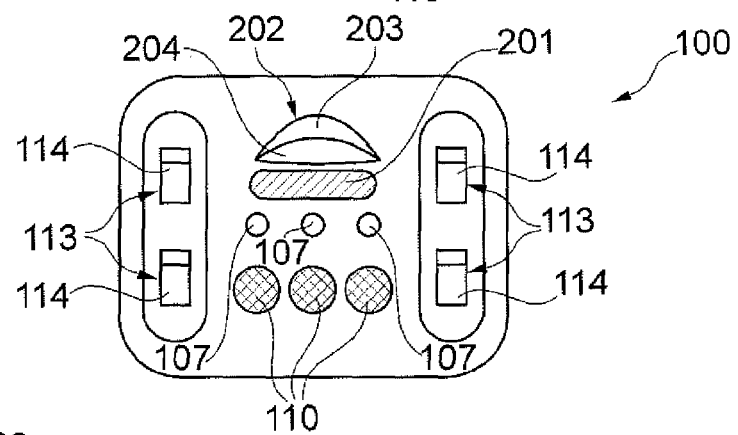
FIG. 2 shows a diagrammatic view of a cross-sectional view of a multifunctional module according to an embodiment.

FIG. 2 shows a multifunctional module 100 with four oxygen supply units 113, each arranged behind a flap 114. The multifunctional module 100 further shows a character display unit 202 for displaying characters to the passengers of the aircraft, with an icon screen 203 arranged in front, or with organic light emitting diode (OLED) films or foils 204. In this arrangement the OLED film or foil can, for example, be affixed to several multifunctional modules 100 as strips for several multifunctional modules 100 after installation of the multifunctional modules 100.

The multifunctional module further comprises a loudspeaker unit 201 for transmitting acoustic data to the passengers of the aircraft.

FIG. 2 shows three reading light units 107 which the multifunctional module 100 comprises and which are designed for providing illumination for reading for passengers of the aircraft.

The multifunctional module further comprises three air nozzle units 110.

Figure 3:
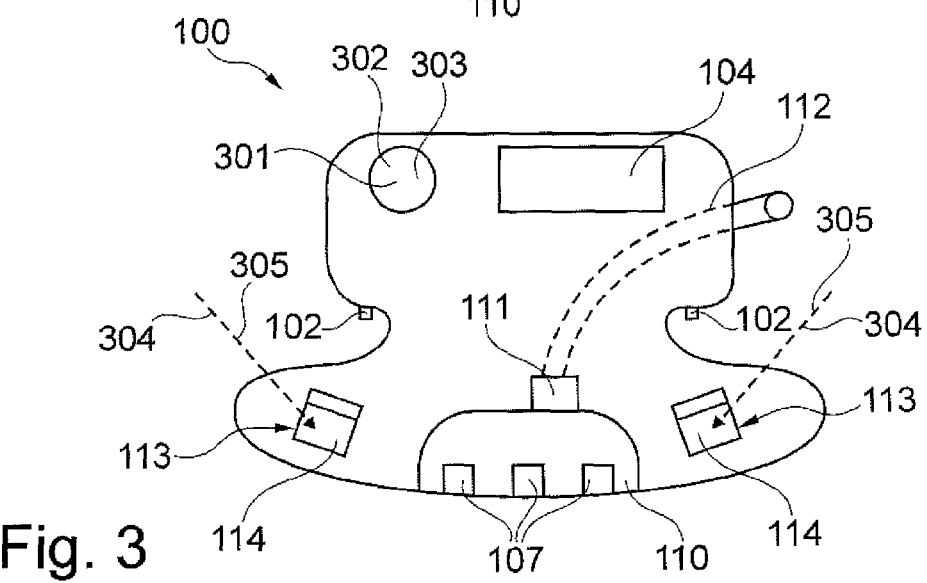
FIG. 3 shows a diagrammatic view of a cross-sectional view of a multifunctional module according to a further embodiment.

FIG. 3, analogously to FIG. 1, shows a multifunctional module with a communication unit 104, three reading light units 107, an air nozzle unit 110 with a blower unit 111 and a fresh-air supply pipe 112, as well as two oxygen supply units 113, each arranged behind a flap 114. The flaps 114 are designed for automatic opening in the case of an emergency, wherein the flaps 114 are designed for activation by a current impulse 304 or by a data signal 305.

The multifunctional module of FIG. 3 further shows an oxygen storage unit 301 for storing oxygen, and for supplying the oxygen supply units 113 with oxygen, wherein the oxygen storage unit 301 can be made from the group comprising a chemical cartridge 302 and a compressed-gas cylinder 303.

The two first interfaces 102 are designed for connecting the services unit 103 to a passenger services conduit, for example by way of a mechanical interface.

Figure 4A:
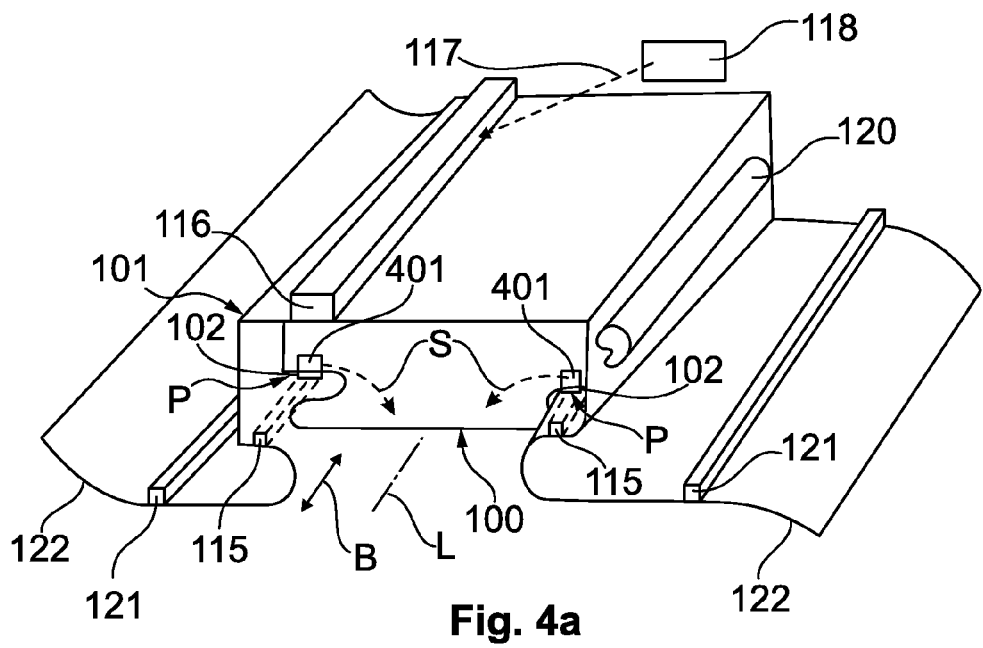
FIG. 4a shows a diagrammatic perspective view of a passenger services conduit with a multifunctional module according to an embodiment.

FIG. 4a shows a perspective view of a passenger services conduit 101 in which a multifunctional module 100 is arranged in a longitudinal axis L of the aircraft so as to be movable in both directions B. In this arrangement two interfaces 102 of the multifunctional module 100 are designed for connection by way of a second interface 115 of the passenger services conduit.

Connecting at least one services unit of the multifunctional module 103 takes place during movement of the multifunctional module 100 to an end position P when the multifunctional module is installed on the passenger services conduit 101.

The multifunctional module 100 comprises two position acquisition units 401 that are designed for acquiring a defined end position P of the multifunctional module 100 when the multifunctional module 100 is installed on the passenger services conduit 101. The position acquisition units 401 are designed for emitting a signal S when the defined end position P of the multifunctional module 100 has been reached during installation of the multifunctional module 100 on the passenger services conduit 101, wherein the signal S can be acoustic or visual.

FIG. 4a further shows a power supply unit 116 of the passenger services conduit 101, for wirelessly transmitting 117 power from a power source 118 of the aircraft, for example by way of electromagnetic coupling. A supply pipe 120 for supplying the multifunctional module 100 with fresh air is affixed to the passenger services conduit 101. The passenger services conduit is connected to the aircraft cabin wall 122 in each case by way of a connection 121.

Figure 4B:
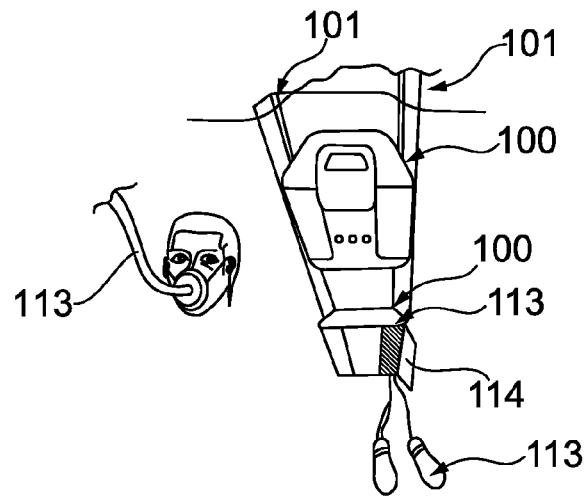
FIG. 4b shows a diagrammatic perspective view from below of a passenger services conduit with two multifunctional modules according to an embodiment.

FIG. 4b shows a diagrammatic perspective view from below of a passenger services conduit 101 with two multifunctional modules 100, wherein in the multifunctional modules 100 oxygen supply units 113 are integrated which in each case are arranged behind a flap 114. The flaps 114 are designed for automatic opening in the case of an emergency, wherein the flaps 114 are designed for activation by a current impulse or by a data signal.

Figure 4C:
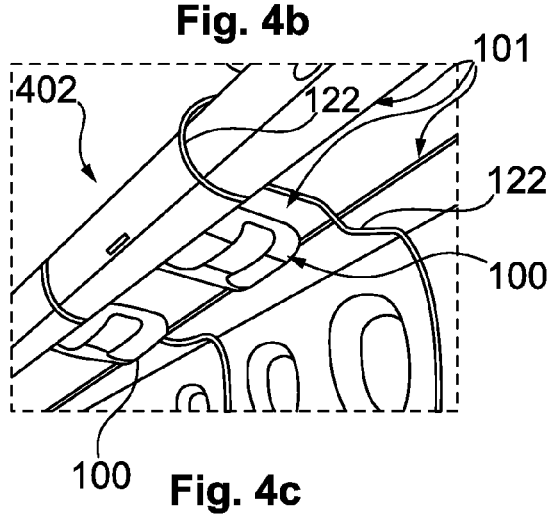
FIG. 4c shows a diagrammatic perspective view from below of a section of an aircraft cabin with a passenger services conduit and two multifunctional modules according to an embodiment.

FIG. 4c shows a diagrammatic perspective view from below of a section of an aircraft cabin 402 with a passenger services conduit 101 and two multifunctional modules 100 connected to it. The passenger services conduit 101 is affixed to aircraft cabin walls 122.

FIG. 5 shows a diagrammatic view of an aircraft 500 with three multifunctional modules 100 and a cabin management system 119 that is designed for wireless communication with the multifunctional modules 100.

Figure 6:
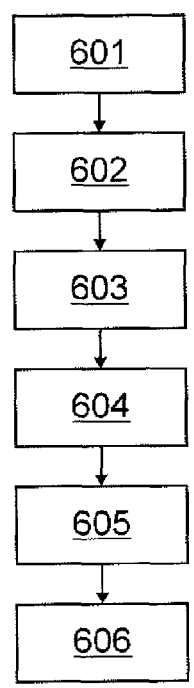
FIG. 6 shows a flow chart of a method for providing services to passengers by means of a multifunctional module for a passenger services conduit in an aircraft according to an embodiment.

FIG. 6 shows a flow chart of a method 600 for providing services to passengers by means of a multifunctional module for a passenger services conduit in an aircraft, with the method involving the following steps: in a step 601 integrating at least one services unit in the multifunctional module takes place. In a further step 602 affixing the multifunctional module to the passenger services conduit by means of a first interface, for example by means of a mechanical interface, takes place. In a step 603 providing at least one function by means of the at least one services unit for a passenger of the aircraft takes place. In a further step 604 automatic connection of the at least one services unit during movement of the multifunctional module to an installation position during installation of the multifunctional module on the passenger services conduit takes place. In step 605 wirelessly providing the multifunctional module with power by means of a power supply unit takes place. In a step 606 wirelessly receiving and wirelessly transmitting data for controlling the at least one services unit of the multifunctional module by means of a communication unit takes place.

Although the embodiments have been described with reference to the exemplary embodiments, various alterations and modifications can be carried out without leaving the scope of protection. A multifunctional module can be used for a passenger services conduit in an aircraft and in any other transportation means, for example rail vehicles, water craft or spacecraft.

In addition, it should be pointed out that "comprising" does not exclude other elements or steps, and "a" or "one" does not exclude a plural number. In particular, the multifunctional module for a passenger services conduit in an aircraft can, for example, comprise more than one first interface, more than one services unit for providing services to a passenger, more than one communication unit, more than one reading light unit, more than one loudspeaker unit, more than one character display unit, more than one air nozzle unit, more than one blower unit, more than one fresh-air supply pipe, more than one oxygen supply unit, more than one oxygen storage unit, more than one chemical cartridge, more than one compressed-gas cylinder, more than one position acquisition unit, more than one flap, and the passenger services conduit can comprise more than one multifunctional module, more than one second interface, more than one power supply unit, more than one supply pipe, and the aircraft can comprise more than one cabin management system and more than one multifunctional module.

Furthermore, it should be pointed out that features or steps which have been described with reference to one of the above exemplary embodiments can also be used in combination with other characteristics or steps of other exemplary embodiments described above. Moreover, while at least one exemplary embodiment has been presented in the foregoing summary and detailed description of the invention, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A passenger services conduit for an aircraft, comprising:
a multifunctional module, comprising:
at least one services unit configured to supply passengers; and
a first interface that is configured to connect the at least one services unit;
a second interface that is configured to connect the at least one services unit of the multifunctional module via the first interface;
a power supply unit that is configured for wireless transmission of power from a power source of the aircraft to the power supply unit; and
a position acquisition unit that acquires a predefined end position of the first interface of the multifunctional module during installation of the multifunctional module on the second interface of the passenger services conduit and the position acquisition unit emits a signal when the multifunctional module has reached the predefined end position during installation of the multifunctional module on the passenger services conduit,
wherein connecting of the at least one services unit takes place automatically during movement of the first interface of the multifunctional module to the predefined end position on the second interface of the passenger services conduit when the multifunctional module is installed on the passenger services conduit and the passenger services conduit is affixed to an aircraft cabin wall.

2. The passenger services conduit of claim 1, further comprising:
a communication unit configured for wirelessly receiving and for wirelessly transmitting data to control the at least one services unit of the multifunctional module.

3. The passenger services conduit of claim 1, further comprising:
a reading light unit that is configured to provide illumination for the passengers of the aircraft.

4. The passenger services conduit of claim 3, wherein the reading light unit is a light emitting diode technology.

5. The passenger services conduit of claim 3, wherein the reading light unit is an organic light emitting diode technology.

6. The passenger services conduit of claim 1, further comprising:
a loudspeaker unit that is configured to transmit acoustic data to the passengers of the aircraft.

7. The passenger services conduit of claim 1, further comprising:
a character display unit that is configured to display characters to a passenger of the aircraft.

8. The passenger services conduit of claim 7, wherein the character display unit is an icon screen arranged so as to be visible to passengers onboard the aircraft.

9. The passenger services conduit of claim 7, wherein the character display unit comprises organic light emitting diode films.

10. The passenger services conduit of claim 7, wherein the character display unit comprises organic light emitting diode foils.

11. The passenger services conduit of claim 1, further comprising:
an air nozzle unit that is configured to provide air for the passengers of the aircraft; and
a blower unit that is configured to suck in and blow out ambient air for the air nozzle unit.

12. The passenger services conduit of claim 1, further comprising:
an oxygen supply unit that is configured to supply the passengers with oxygen; and
an oxygen storage unit configured to store oxygen and configured to supply the oxygen supply unit with oxygen.

13. The passenger services conduit of claim 12, wherein the oxygen storage unit is made from a chemical cartridge.

14. The passenger services conduit of claim 12, wherein the oxygen storage unit comprises a compressed-gas cylinder.

15. The passenger services conduit of claim 12, further comprising:
a flap that is configured to automatically open in case of an emergency and further configured to activate by a signal, wherein the oxygen supply unit is arranged behind the flap.

16. An aircraft, comprising:
a passenger services conduit affixed to an aircraft cabin wall, the passenger services conduit comprising:
a multifunctional module, comprising:
at least one services unit configured to supply a passenger; and
a first interface that is configured to connect the at least one services unit;
a second interface that is configured to connect the at least one services unit of the multifunctional module via the first interface;
a power supply unit that is configured for wireless transmission of power from a power source of the aircraft to the power supply unit;
a cabin management system that is configured to communicate with the multifunctional module; and
a position acquisition unit that acquires a predefined end position of the first interface of the multifunctional module during installation of the multifunctional module on the second interface of the passenger services conduit and the position acquisition unit emits a signal when the multifunctional module has reached the predefined end position during installation of the multifunctional module on the passenger services conduit,
wherein connecting of the at least one services unit to the passenger services conduit takes place automatically during movement of the first interface of the multifunctional module to the predefined end position on the second interface of the passenger services conduit when the multifunctional module is installed on the passenger services conduit.

17. A method for providing services to passengers with a multifunctional module for a passenger services conduit in an aircraft, the passenger services conduit comprising:
the multifunctional module, comprising:
at least one services unit configured to supply a passenger; and
a first interface that is configured to connect the at least one services unit;
a second interface that is configured to connect the at least one services unit of the multifunctional module via the first interface; and
a power supply unit that is configured for wireless transmission of power from a power source of the aircraft to the power supply unit, the method comprising:

integrating the at least one services unit in the multifunctional module;

acquiring a predefined end position of the first interface of the multifunctional module during installation of the multifunctional module on the second interface of the passenger services conduit with a position acquisition unit;

emitting a signal when the multifunctional module has reached the predefined end position during installation of the multifunctional module on the passenger services conduit;

automatically connecting the at least one services unit during movement of the first interface of the multifunctional module to the predefined end position on the second interface of the passenger services conduit when the multifunctional module is installed on the passenger services conduit, the passenger services conduit affixed to an aircraft cabin wall; and providing at least one function with the at least the services unit for the passengers of the aircraft.

18. The method of claim 17, further comprising:

wirelessly providing the multifunctional module with power from the power supply unit; and wirelessly receiving and wirelessly transmitting data for controlling the at east one services unit of the multifunctional module with a communication unit.

\* \* \* \* \*

UNITED STATES PATENT AND TRADEMARK OFFICE
CERTIFICATE OF CORRECTION

| | | |
|---|---|---|
| PATENT NO. | : 8,844,865 B2 | Page 1 of 1 |
| APPLICATION NO. | : 13/277289 | |
| DATED | : September 30, 2014 | |
| INVENTOR(S) | : Marcus Gehm, Thomas Vogt and Andreas Dannenberg | |

It is certified that error appears in the above-identified patent and that said Letters Patent is hereby corrected as shown below:

In the Claims:

Column 11, line 16, Claim 17, "the" should be changed to --one--

Column 11, line 25, Claim 18, "east" should be changed to --least--

Signed and Sealed this
Seventeenth Day of March, 2015

Michelle K. Lee
*Director of the United States Patent and Trademark Office*